US006634296B2

(12) United States Patent
Harris

(10) Patent No.: US 6,634,296 B2
(45) Date of Patent: Oct. 21, 2003

(54) PRINTER DOCUMENT PRESENTER APPARATUS AND METHOD

(75) Inventor: Richard Hunter Harris, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/102,156

(22) Filed: Mar. 20, 2002

(65) Prior Publication Data

US 2003/0177928 A1 Sep. 25, 2003

(51) Int. Cl.[7] .......................... B41L 47/56; B41F 13/56; B41F 5/04; B41J 11/44; B41J 11/54; B41J 15/00; B65H 43/00; B65H 7/02
(52) U.S. Cl. .................. 101/484; 101/223; 101/224; 400/578; 400/582; 400/596; 271/176; 271/265.01
(58) Field of Search .................. 101/484, 483, 101/225, 226, 227, 228; 400/68, 578, 582, 596, 621, 708; 221/9, 12, 21, 259, 277; 271/3.1, 265.01, 268, 176, 314

(56) References Cited

U.S. PATENT DOCUMENTS

| 4,462,509 A | * | 7/1984 | Adelberger ............... 221/259 |
| 4,941,656 A | * | 7/1990 | Davies et al. ............. 271/278 |
| 5,407,115 A | | 4/1995 | Blalock et al. ............. 225/1 |
| 5,435,542 A | * | 7/1995 | Van Pham et al. ......... 271/246 |
| 5,635,704 A | | 6/1997 | Del Signore, II et al. .. 250/205 |
| 5,879,090 A | * | 3/1999 | Hoyt et al. ................. 400/578 |
| 5,921,686 A | | 7/1999 | Baird et al. ................. 400/68 |
| 5,936,655 A | | 8/1999 | Biedermann ............... 347/218 |
| 5,954,438 A | | 9/1999 | Klein et al. ................ 400/621 |
| 6,155,731 A | | 12/2000 | Bertalan et al. ............ 400/621 |
| 6,183,152 B1 | | 2/2001 | Kumai et al. ............... 400/611 |
| 6,270,270 B2 | | 8/2001 | Koshi et al. ................ 400/621 |
| 6,293,718 B1 | | 9/2001 | Osmus ....................... 400/625 |
| 2002/0053594 A1 | * | 5/2002 | Haney et al. ............... 235/381 |

* cited by examiner

Primary Examiner—Andrew H. Hirshfeld
Assistant Examiner—Hoai-An D. Nguyen
(74) Attorney, Agent, or Firm—J. Bruce Schelkopf; Winstead Sechrist & Minick

(57) ABSTRACT

A kiosk printer for unattended operation is equipped with a presenter to prevent a user from prematurely trying to remove a printed document. The presenter has motor driven feed rollers and a document sensor for determining when the printing document is in the presenter document path. The presenter has a home position adjacent to the printer document exit path. When printing starts, the document enters the presenter feed rollers and is sensed by a document sensor. A drive motor moves the presenter at the same rate as the printing document. When the presenter reaches a feed position it stops and the document sags and forms a document loop as printing continues. When printing stops, the presenter feed rollers feed the document from the kiosk to a user. When the printed document has exited the presenter, the presenter returns to the home position awaiting succeeding printed document.

36 Claims, 6 Drawing Sheets

PRINTER DOCUMENT PRESENTER APPARATUS AND METHOD

TECHNICAL FIELD

The present invention relates in general to printers used in point of sale kiosks, where the printer may work without an attendant.

BACKGROUND INFORMATION

A kiosk is a small, self-standing structure such as a news stand or ticket booth. Some unattended multimedia kiosks dispense public information via computer screens and may have either a keyboard, touch-screen or both used for input. Some kiosks are used for point of sales and may need to provide the user with a printed receipt or a ticket to a purchased event.

Kiosks are often located in places that are remote and the user is free to operate the kiosk without supervision from a merchant. A good kiosk design requires that the unit be as reliable as possible. The mechanisms must be reliable and every possible means of operator induced failures need to be eliminated. Printers in kiosks have been particularly vulnerable to operator induced failures. A common mode of printer failure occurs when the operator grabs a receipt document generated by the kiosk printer before the printing is complete thereby causing a paper jam. Several kiosk printer manufacturers have addressed this failure mode by designing a mechanism known as a presenter.

A presenter allows the kiosk printer to complete printing a document before the operator has the opportunity to extract the document. When printing is complete, the document is fed very rapidly from the kiosk giving the operator almost no time or reason to prematurely grab the document before it is fully available. There are several different methods used in presenter mechanisms to allow the printed document to be accumulated within the kiosk while allowing printing to complete. Most presenter mechanisms allow the document to "loop", some have methods of coiling the document; but all known methods require the document to be pushed a distance before the loop or coil is created. The looping method requires the document to be pushed across a bridge a distance before the leading edge of the document is stopped. Feeding additional document length causes the portion of the document that spans the bridge to buckle. In the coiling method, the document is pushed into a coiling cage until printing is complete, then the entrance to the coiling cage is flipped in position opposite the exit slot of the enclosure. Once the coiling cage is in the proper position, the feed drive mechanism is reversed and the document is presented to the operator or user. Those skilled in printer design understand that a printer mechanism that "pushes" documents is far less reliable than one that pulls the document.

There is, therefore, a need for a presenter for a kiosk printer that does not push the document and will prevent the user of the kiosk from prematurely trying to extract a document from the kiosk before printing is complete.

SUMMARY OF THE INVENTION

A kiosk printer has a presenter mechanism that pivots and moves between two positions in response to a signal from a paper or document sensor. The presenter has a set of motor driven presenter rollers for moving a document from the presenter and a document sensor for detecting when a document is in the presenter document exit path. If no document is present in the presenter document exit path (e.g., a user has removed a receipt), the presenter returns to its "home" position where the presenter rollers are directly opposite the kiosk printer document exit path and positioned to receive a printed document.

When the kiosk printer starts printing a document, it feeds the document into the rotating presenter feed rollers. As soon as the document sensor in the presenter senses the document, the presenter is moved (pivoted) by a motor so the presenter moves at the same rate as the document exiting the kiosk printer. In this manner, the document does not buckle. The presenter pivots to a predetermined position where it stops creating a document "bridge". At this point the document is hidden from view of the user of the kiosk. As the printer continues to print, the document (spanning the bridge) buckles and forms a loop between the printer document exit and the presenter. When printing is complete, the printer cuts the document and signals the presenter to feed the document to the user. The presenter feed rollers then feed the finished cut document through the document exit. If the user grabs the document, it freely moves from the presenter and the printer mechanism and feed path are protected. The presenter, according to embodiments of the present invention, predominately pulls the document through the document path while preventing a user from prematurely trying to extract the document before printing is complete. In an alternate embodiment, the document may be fed partially out of the presenter awaiting user action to physically remove the document. Then after a predetermined time, the presenter feed rollers are reversed and the document is fed into an internal trash bin or shredder in the kiosk.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
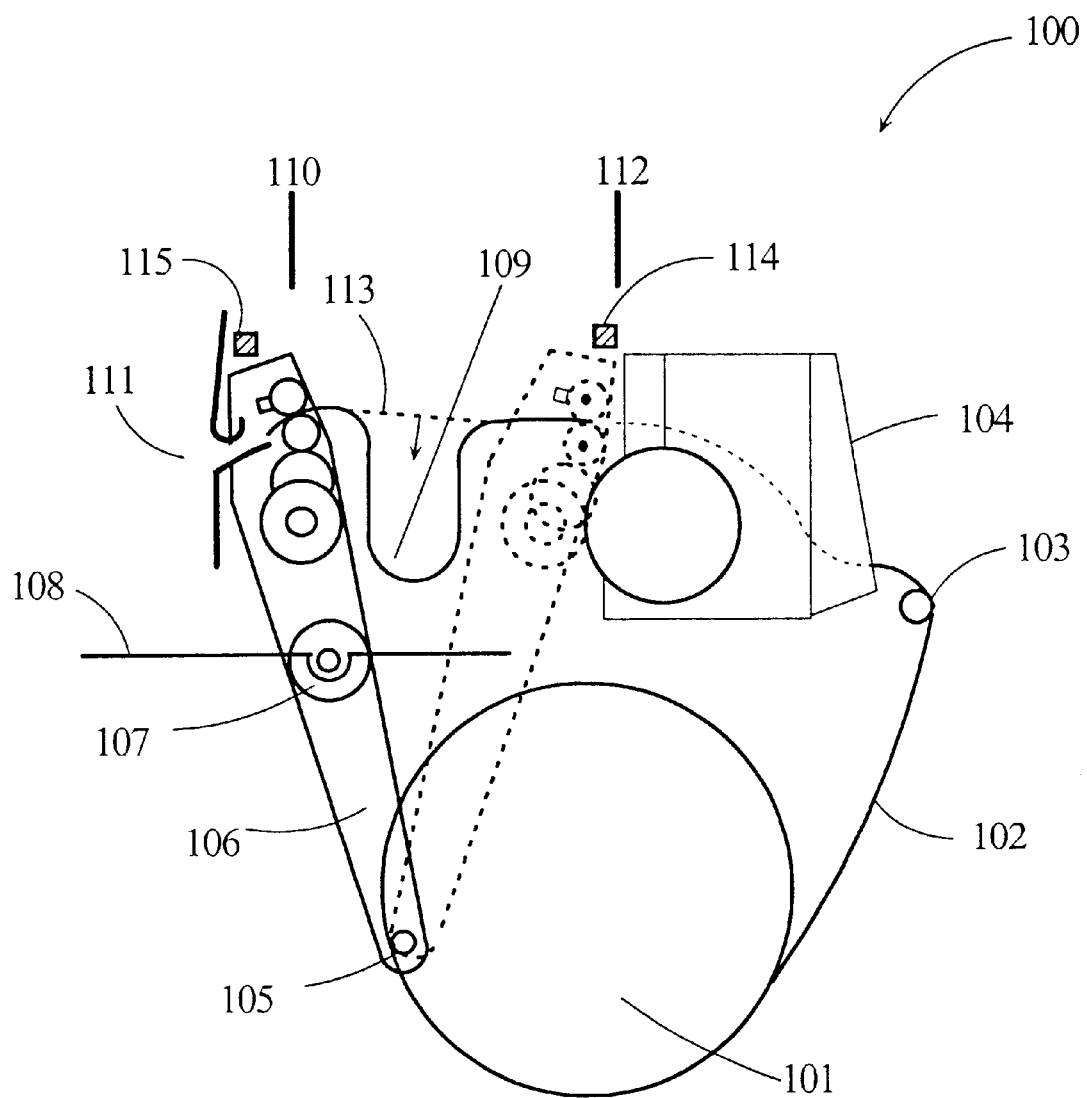
FIG. 1 is a drawing of one embodiment of the present invention with the presenter in the two positions relative to the printing mechanism.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a kiosk printer system 100 according to embodiments of the present invention. Much of the detail of kiosk printer 100 is not shown so that the operation of the presenter 106 may be more easily seen. Documents are printed from a paper roll 101. Paper 102 is threaded around a tension roller 103 into a print station 104. Presenter 106 is shown dotted in position 112 next to the document exit path of print station 104. Print station drive rollers (not shown) pull the paper document from paper roll 101 to begin the printing process. Before printing starts, the presenter home sensor 114 confirms that the presenter is in position 112. The paper is fed under a print head (not shown) where printing starts and the presenter feed rollers 201 (see FIG. 2) start to rotate. As the document is printed, it exits the print station 104 and enters presenter 106, is fed through the presenter feed rollers 201 and the presence of the document is sensed. As soon as the document is sensed, the presenter feed rollers 201 stop rotating and the action of drive belt 108 and motor 107 drive presenter 106 to pivot about 105 until it reaches feed position 110. During this time, the presenter moves at a rate so that the document is "pulled" from the document exit path of the printer at the same rate as printing. When the presenter reaches the feed position 110, it stops. During this time, a document bridge 113 has been formed. As document printing continues, the print station drive rollers cause the document bridge 113 to "buckle" to form document loop 109. When printing completes, the print station 104 cuts the document and signals to presenter 106 to "present" the document to the user. At this time, the presenter feed rollers 201 within the presenter 106 pull the cut document in loop 109 and deliver the document from presenter exit 111 to the user. Document feed position sensor 115 is used to sense when the presenter 106 is in position 115 to feed a document from the kiosk. Likewise home position sensor 114 senses when the presenter 106 is in the home position 114 to enable printing to start.

Figure 2:
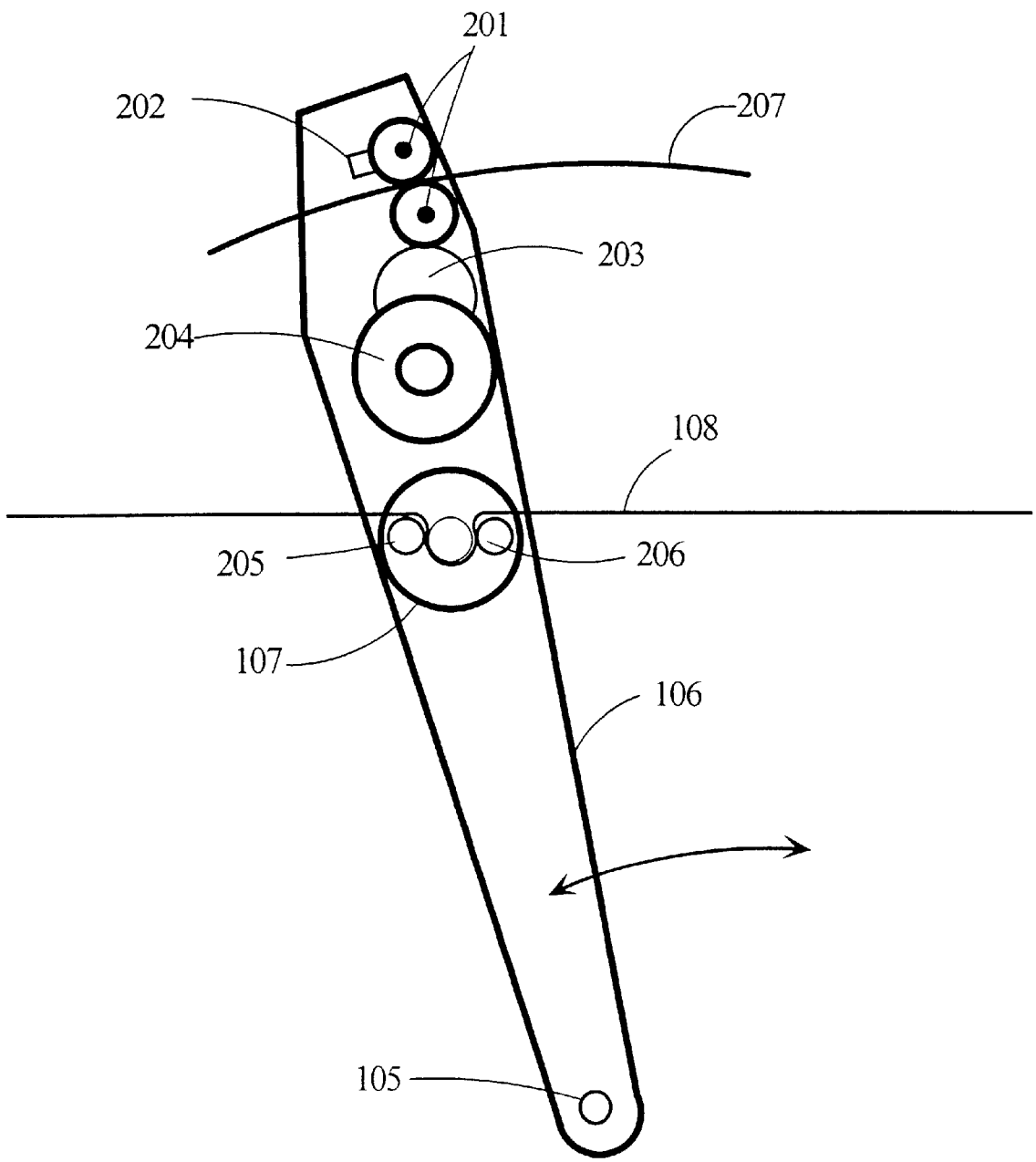
FIG. 2 is a drawing of details of the presenter according to embodiments of the present invention.

FIG. 2 is a more detailed drawing of presenter 106. A document 207 is engaged in presenter feed rollers 201. Paper sensor 202 senses when document 207 is within drive rollers 201. Document feed rollers 201 are driven by motor 204 via idler 203. Drive belt 108 engages motor 107 with rollers 205 and 206 to drive presenter 106 about pivot 105. The ends of drive belt 108 would be fixed causing motor 107 and thus presenter 106 to move along drive belt 108 when the shaft of motor 107 rotates. In this implementation, presenter 106 is only free to pivot in response to rotation of motor 107. Presenter 106 may be made to translate laterally instead of pivoting; however, pivoting may result in a simpler and more reliable implementation.

Figure 5:
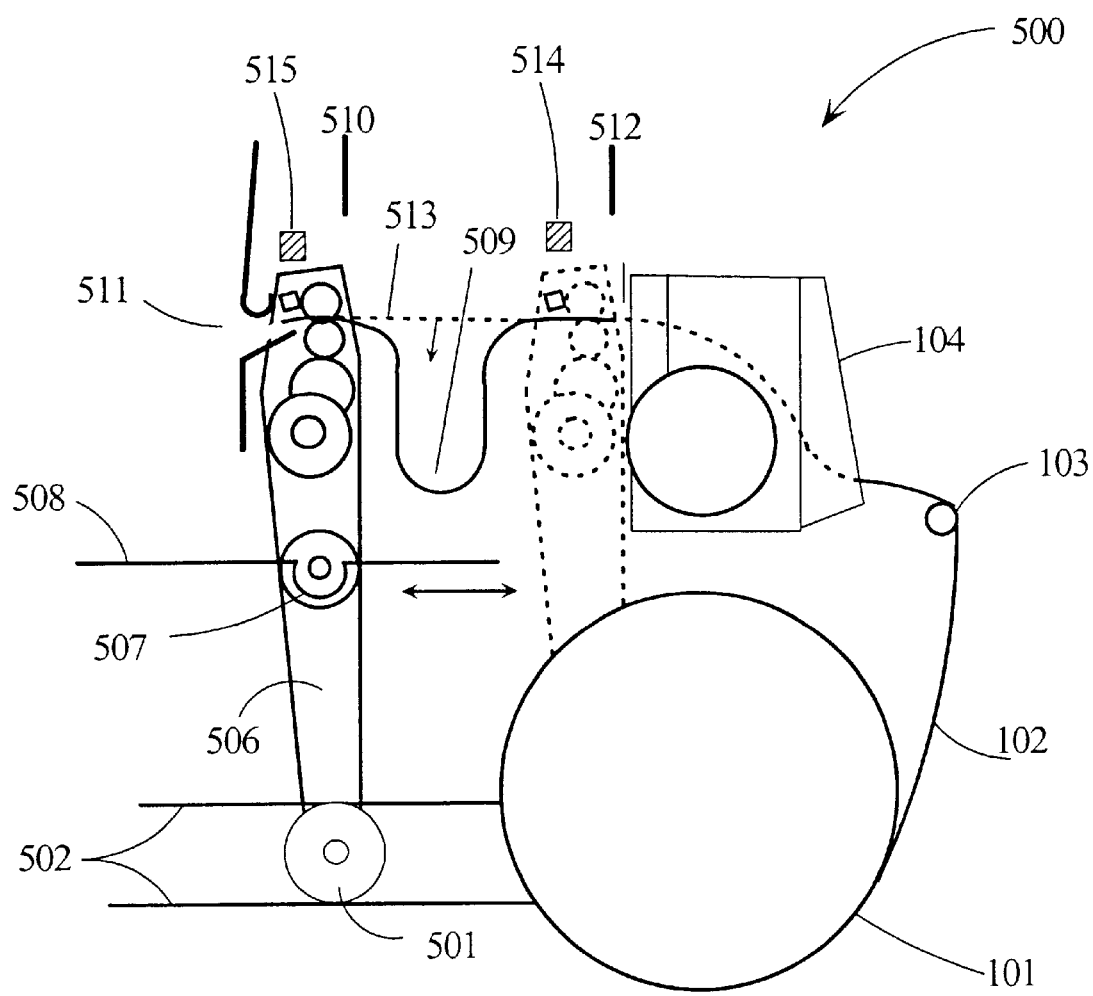
FIG. 5 is a drawing of another embodiment of the present invention where the presenter is translated.

FIG. 5 illustrates printer system 500 with another embodiment of the present invention where the presenter is translated instead of rotated. Much of the detail of kiosk printer system 500 is not shown so that the operation of the presenter 506 may be more easily seen. Documents are printed from a paper roll 101. Paper 102 is threaded around a tension roller 103 into a print station 104. Presenter 506 is shown dotted in position 512 next to the document exit path of print station 104. Print station drive rollers (not shown) pull the paper document from presenter 506 is shown dotted in position 512 next to the document exit path of print station 104. Print station drive rollers (not shown) pull the paper document from paper roll 101 to begin the printing process. Before printing starts, the presenter home sensor 514 confirms that the presenter is in position 512. The paper is fed under a print head (not shown) where printing starts and the presenter feed rollers 201 (see FIG. 2) start to rotate. As the document is printed, it exits the print station 104 and enters presenter 506, is fed through the presenter feed rollers 201 and the presence of the document is sensed. As soon as the document is sensed, the presenter feed rollers 201 stop rotating and the action of drive belt 508 and motor 507 drive presenter 506 to translate in guides 502 on roller 501 until it reaches feed position 510. During this time, the presenter moves at a rate so that the document is "pulled" from the document exit path of the printer at the same rate as printing. When the presenter reaches the feed position 510, it stops. During this time, a document bridge 513 has been formed. As document printing continues, the print station drive rollers cause the document bridge 513 to "buckle" to form document loop 509. When printing completes, the print station 104 cuts the document and signals to presenter 506 to "present" the document to the user. At this time, the presenter feed rollers 201 within the presenter 506 pull the cut document in loop 509 and deliver the document from presenter exit 511 to the user. Document feed position sensor 515 is used to sense when the presenter 506 is in position 510 to feed a document from the kiosk. Likewise home position sensor 514 senses when the presenter 506 is in the home position 512 to enable printing to start.

Figure 3:
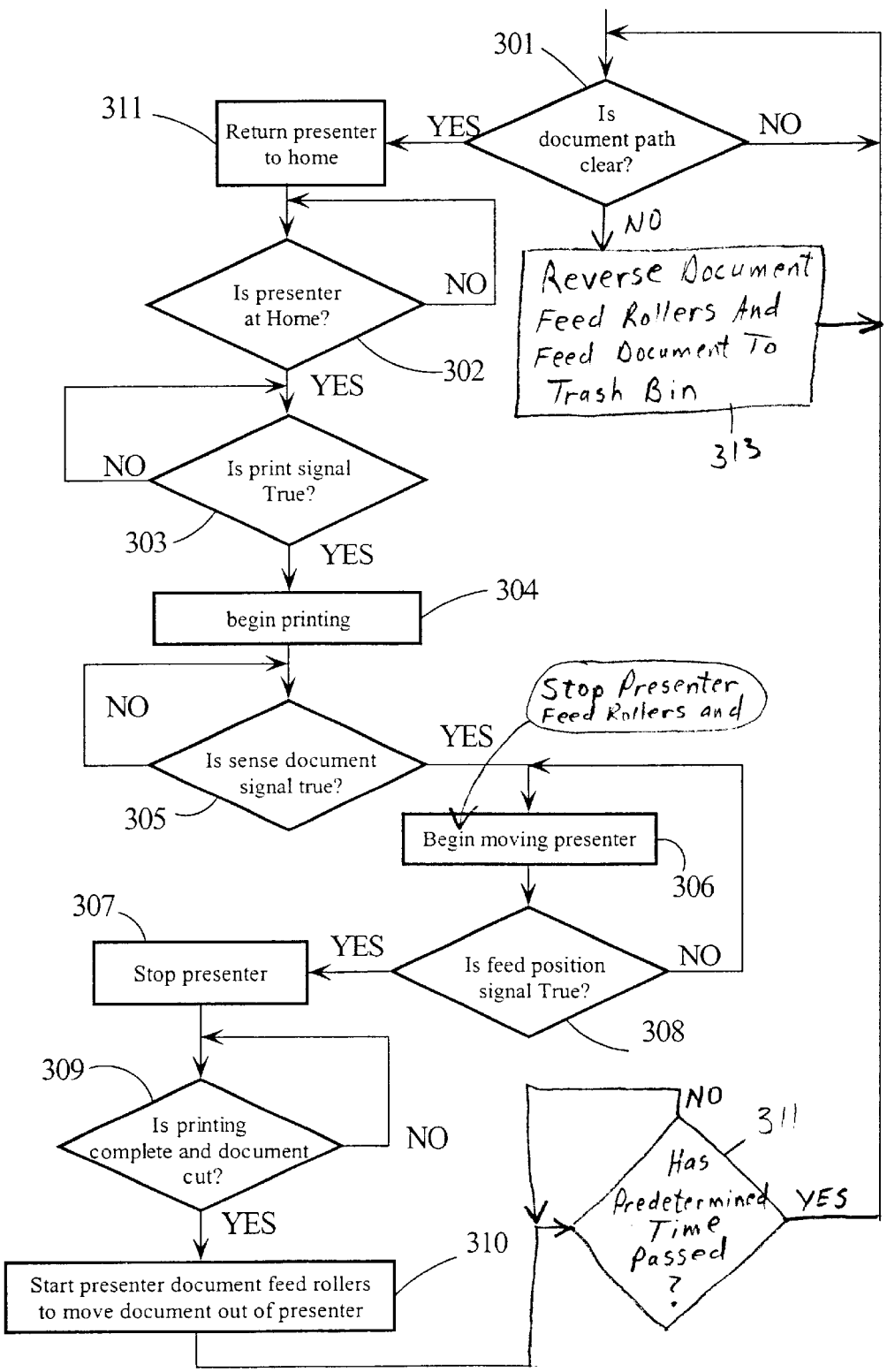
FIG. 3 is a flow diagram of method steps in embodiments of the present invention.
Figure 6:
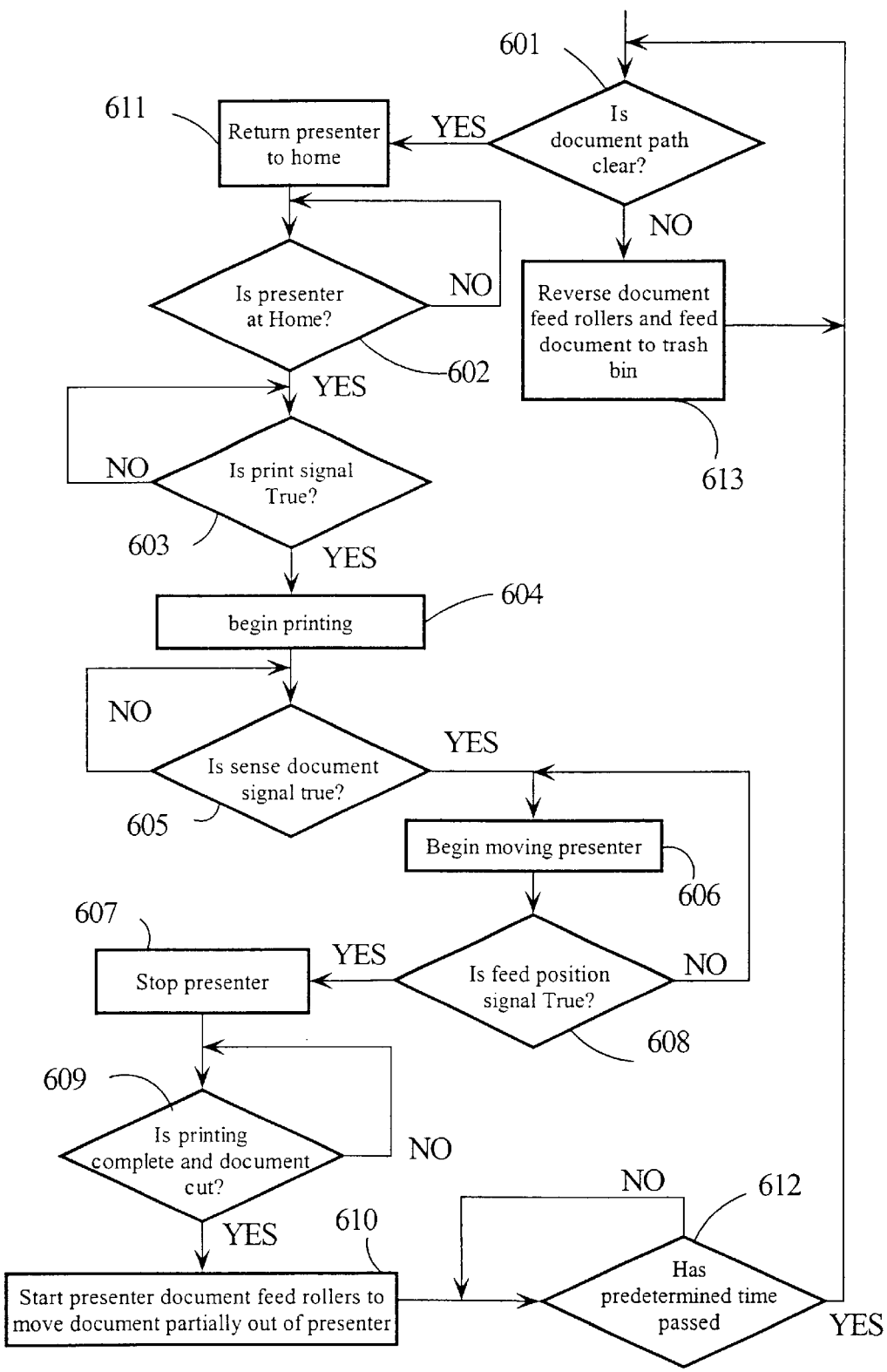
FIG. 6 is another flow diagram of method steps in an alternate embodiment of the present invention.

FIG. 3 and FIG. 6 are flow diagrams of method steps according to embodiments of the present invention.

Referring to FIG. 3. In step 301, a test is done to determine if the document path is clear. If the document path is not clear a wait is done until the document path is clear. If the result of the test in step 301 is YES, then the presenter is returned to the home position 112 in step 311. In step 302, a test is done to determine if the presenter 106 is at the home position 112 indicated by home sensor 114. If the result of the test in step 302 is NO, then the printer waits for the presenter 106 to arrive at the home position 112. If the result of the test in step 302 is YES, then in step 303 a test is done to determine if a begin print signal has been received. If the result of the test in step 303 is NO, then the printer waits for a begin print signal. When a print signal has been received, printing begins in step 304. In step 305 a test is done to determine if the document edge has reached the document sensor 202 in the presenter 106. If the result of the test in step 305 is YES, then the document is within presenter feed rollers 201. If the document is not within the presenter feed rollers 201, then a wait is executed. In step 306, presenter feed rollers 201 are stopped and presenter 106 begins to move at the same rate as the document 102 forming document bridge 113.

In step 308, feed position sensor 115 is sampled to determine if presenter 106 has reached feed position 110. Presenter 106 keeps moving until the result of the test in step 308 is YES indicating that the feed position 110 has been reached. Presenter 106 stops pivoting in step 307 when the feed position signal is True. Printing continues at this point forming loop 109. In step 309, a test is done to determine if printing is complete and the continuous document 102 has been cut. When the result of the test in step 309 is YES, then in step 310 the presenter is signaled to start motor 204 which engage document feed rollers 201 to move document 207 from the document exit path 111 of presenter 106. In step 311 a test is done to determine if a predetermined time has passed. This gives a user time to remove the partially exited document from the presenter. After the predetermined time has elapsed, a branch is taken back to step 301 where the determination is made whether the partially exited document has been removed. A branch is taken back to step 301 where the presenter 106 waits until the document sensor 202 indicates that document 207 has cleared the presenter 106 before returning to home position 112 by action of motor 107 and drive belt 108.

FIG. 6 is a flow diagram of method steps in an alternate embodiment of the present invention. In step 601, a test is done to determine if the document path is clear. If the document path is not clear then in step 613 the document feed rollers 201 are reversed feeding the document into a trash bin (not shown) in the kiosk. If the result of the test in step 601 is YES, then the presenter is returned to the home position 112 in step 611. In step 602, a test is done to determine if the present is at the home position 112 indicated by home sensor 114. If the result of the test in step 602 is NO, then the printer waits for the presenter 106 to arrive at the home position 112. If the result of the test in step 602 is YES, then in step 603 a test is done to determine if a begin print signal has been received. If the result of the test in step 603 is NO, then the printer waits for a begin print signal. When a print signal has been received, printing begins in step 604. In step 605 a test is done to determine if the document edge has reached the document sensor 201 in the presenter 106. If the result of the test in step 605 is YES, then the document is within presenter feed rollers 201. If the document is not within the presenter feed rollers 201, then a wait is executed. In step 606, presenter 106 begins to move at the same rate as the document 102 forming document bridge 113.

In step 608, a test is done to determine if presenter 106 has reached feed position 110. Presenter 106 keeps moving until the result of the test in step 608 is YES indicating that the feed position 110 has been reached. Presenter 106 stops pivoting in step 607 when the feed position signal is True. Printing continues at this point forming loop 109. In step 609, a test is done to determine if printing is complete and the continuous document 102 has been. When the result of the test in step 609 is YES, then the presenter is signaled to start motor 204 which engage drive rollers 201 to move document 207 partially from the document exit path 111 of presenter 106. In step 612 a test is done to determine if a predetermined time has passed. This gives a user time to remove the partially exited document from the presenter. After the predetermined time has elapsed, a branch is taken back to step 601 where the determination is made whether the partially exited document has been removed.

Figure 4:
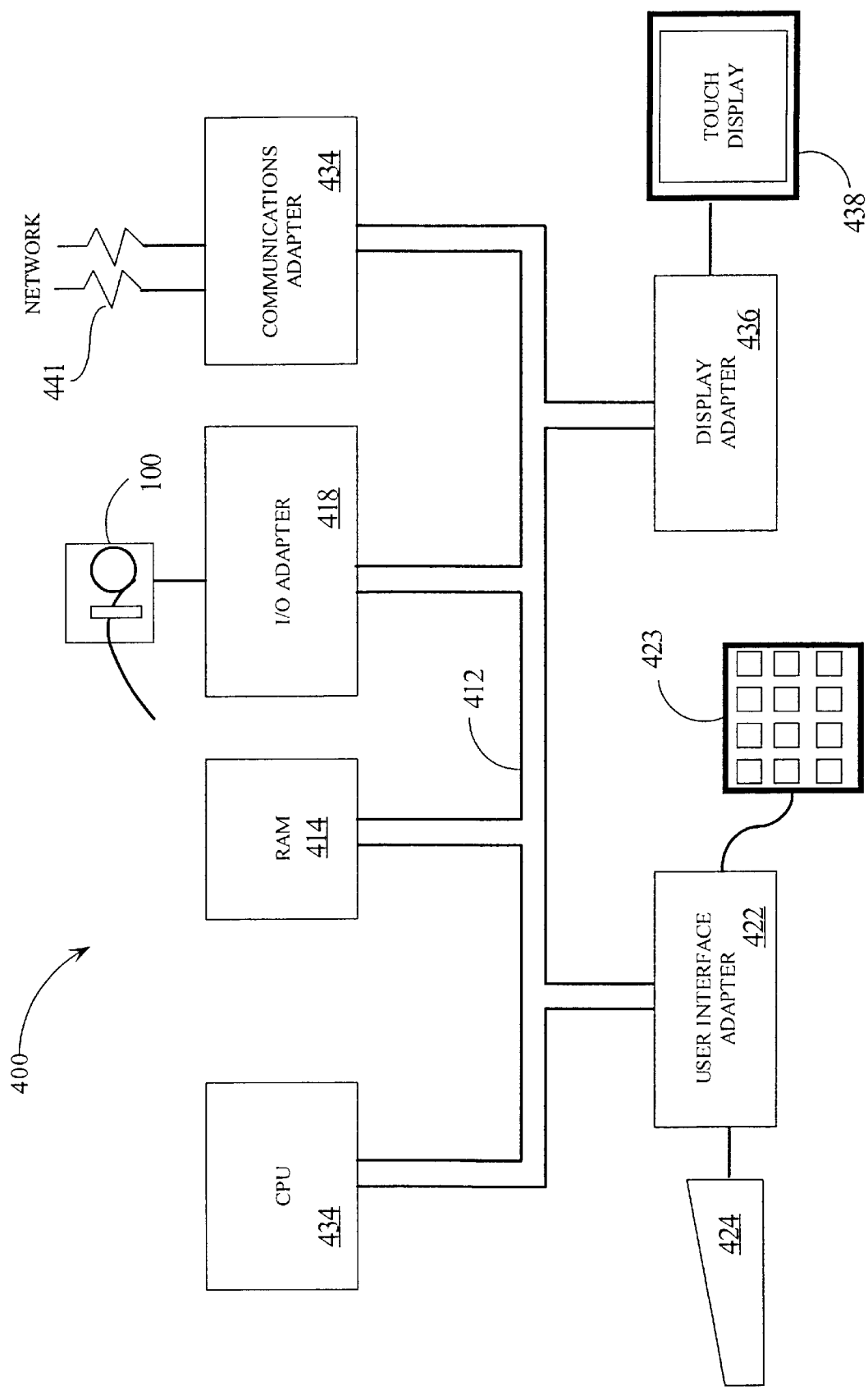
FIG. 4 is a block diagram of a kiosk system configured to use a printer with a presenter according to embodiments of the present invention.

FIG. 4 is a block diagram of a representative kiosk system 400 configured to use a printer 100 which incorporates a presenter 106 according to embodiments of the present invention. Kiosk system 400 contains a central processing unit (CPU) 434 which controls functions of the kiosk system 400 and processes user entered information and retrieves and presents information based on the user inputs (e.g., keyboard 424, keypad 423 or touch-screen 438). CPU 434 may store and retrieve information from random access memory 414 or from remote data storage devices connected over network interface 441. System bus 412 is used to interconnect all the various units of kiosk system 400. RAM 414 may also contain non-volatile memory that does not lose content if power is lost. Printer 100 is coupled to CPU 434 via bus 412 and input/output (I/O) adapter 418. A touch-screen 438 is coupled to CPU 434 via bus 412 and display adapter 436 and may be used to present user information as well as receive input commands. Kiosk system 400 may or may not have both a touch-screen 438 and a keypad 423. A kiosk system 400 may have a conventional display and use a keyboard 424 or a keypad 423 for user inputs. Network 441 may be used to process credit card information or validate other user payment methods. Kiosk system 400 may contain a mechanism for dispensing point of sale items purchased by a user. A receipt for a point of sale transaction by a user is printed on printer 100 and presented to the user via a presenter 106 according to embodiments of the present invention. CPU 434 may be programmed to generate control signals for the printer 100 in response to signals indicating the position of the presenter 106 and the status of document sensor 202. Alternately, printer 100 may have a self-contained controller (not shown) for printer operations with presenter 106 according to embodiments of the present invention. In this case, CPU 434 may only generate print data in response to user inputs and programmed data processing using the user inputs and stored data.

Although the present invention and its advantages have been described in detail, it should be understood that various changes, substitutions and alterations can be made herein without departing from the spirit and scope of the invention as defined by the appended claims.

What is claimed is:

1. A kiosk printer comprising:

a presenter having presenter feed rollers for engaging a document exiting a print station of said kiosk printer and a document sensor for generating a document sensor signal indicating when said document is positioned within a presenter document path of said presenter;

a first motor drive mechanism for moving said presenter from a home position adjacent to a document exit path of said print station to a feed position located a predetermined distance from said home position;

a second motor drive mechanism for rotating said presenter feed rollers to feed a printed document from said presenter document path; and a controller receiving said document sensor signal, a home position signal, a feed position signal, and a print signal and generating motor drive signals for said first and second motor drive mechanisms.

2. The printer of claim 1, wherein said document sensor signal has a first state when said document is within said presenter document path and a second state when said document is not within said presenter document path.

3. The printer of claim 2, wherein said home position signal has a first state when said presenter is at said home position and a second state when not at said home position.

4. The printer of claim 3, wherein said feed position signal has a first state when said presenter is at said feed position and a second state when not at said feed position.

5. The printer of claim 4, wherein said print signal has a first state when said print station is printing said document and a second state when printing of said document is completed and said document is free to be moved from said print station.

6. The printer of claim 3, wherein printing is enabled in response to said first state of said home position.

7. The printer of claim 1, wherein said first motor drive mechanism moves said presenter by pivoting and rotating said presenter away from said home position.

8. The printer of claim 1, wherein said first motor drive mechanism moves said presenter by translating said presenter away from said home position.

9. The printer of claim 7, wherein said presenter moves from said home position to said feed position at a rate substantially equal to a rate said document moves within said print station while being printed.

10. The printer of claim 8, wherein said presenter moves from said home position to said feed position at a rate substantially equal to a rate said document moves within said print station while being printed.

11. The printer of claim 5, wherein said first motor drive mechanism stops said presenter in response to said first state of said feed position signal and said print station continues printing and feeding said document from said print station forming a document loop within said presenter.

12. The printer of claim 11, wherein said second motor drive mechanism drives said feed rollers to move said document from said presenter in response to said second state of said print signal and stops driving said feed rollers after said document has been driven a predetermined distance.

13. The printer of claim 12, wherein said first drive mechanism moves said presenter to said home position in response to said second state of said document sensor signal.

14. The printer of claim 12, wherein said second motor drive mechanism reverses said feed rollers to move said document into a trash bin within said printer if said document remains in said presenter for a predetermined length of time after said feed position signal transitions to said first state.

15. A method of delivering a document from a print station of a printer comprising the steps of:

moving said document while being printed into engagement with motor driven presenter feed rollers of a presenter positioned at a home position adjacent to a document exit path of said print station;

generating a document sensor signal indicating when said document is within said presenter;

moving said presenter from said home position with a presenter drive mechanism at a rate substantially equal to a rate said document moves within said print station while being printed;

stopping said presenter at a feed position, said feed position a bridge distance from said home position; and continuing printing said document until printing is complete thereby forming a document loop within said bridge distance.

16. The method of claim 15 further comprising the step of:

separating said printed document from a document feed roll; and driving said presenter feed rollers to move said printed document a predetermined distance from within said presenter.

17. The method of claim 16 further comprising the step of:

returning said presenter to said home position in preparation for printing a succeeding document in response to said document sensor signal indicating said document is no longer within said presenter.

18. The method of claim 16 further comprising the steps of:

reversing said presenter feed rollers after a predetermined time period if said document sensor indicates said document is still within said presenter;

feeding said document into a trash bin; and returning said presenter to said home position in preparation for printing a succeeding document in response to said document sensor signal indicating said document is no longer within said presenter.

19. The method of claim 15, wherein said printer is incorporated in a point of sale kiosk.

20. The method of claim 15, wherein said presenter moves in a pivoting motion relative to said print station of said printer.

21. The method of claim 15, wherein said presenter moves in a translating motion relative to said print station of said printer.

22. A point of sale kiosk comprising:

a central processing unit (CPU);

a random access memory (RAM);

an input/output (I/O) adapter;

a display adapter coupled to a touch-screen display;

a system bus coupling said CPU, said RAM, said I/O adapter, said display adapter; and a kiosk printer coupled to said I/O adapter, said kiosk printer comprising:

a presenter having presenter feed rollers for engaging a document exiting a print station of said kiosk printer and a document sensor for generating a document sensor signal indicating when said document is positioned within a presenter document path of said presenter;

a first motor drive mechanism for moving said presenter from a home position adjacent to a document exit path of said print station to a feed position located a predetermined distance from said home position;

a second motor drive mechanism for rotating said presenter feed rollers to feed a printed document from said presenter document path; and a controller receiving said document sensor signal, a home position signal, a feed position signal, and a print signal and generating motor drive signals for said first and second motor drive mechanisms.

23. The point of sale kiosk of claim 22, wherein said document sensor signal has a first state when said document is within said presenter document path and a second state when said document is not within said presenter document path.

24. The point of sale kiosk of claim 23, wherein said home position signal has a first state when said presenter is at said home position and a second state when not at said home position.

25. The point of sale kiosk of claim 24, wherein said feed position signal has a first state when said presenter is at said feed position and a second state when not at said feed position.

26. The point of sale kiosk of claim 25, wherein said print signal has a first state when said print station is printing said document and a second state when printing of said document is completed and said document is free to be moved from said print station.

27. The point of sale kiosk of claim 24, wherein printing is enabled in response to said first state of said home position.

28. The point of sale kiosk of claim 22, wherein said first motor drive mechanism moves said presenter by pivoting and rotating said presenter away from said home position.

29. The point of sale kiosk of claim 22, wherein said first motor drive mechanism moves said presenter by translating said presenter away from said home position.

30. The point of sale kiosk of claim 28, wherein said presenter moves from said home position to said feed position at a rate substantially equal to a rate said document moves within said print station while being printed.

31. The point of sale kiosk of claim 29, wherein said presenter moves from said home position to said feed position at a rate substantially equal to a rate said document moves within said print station while being printed.

32. The point of sale kiosk of claim 26, wherein said first motor drive mechanism stops said presenter in response to said first state of said feed position signal and said print station continues printing and feeding said document from said print station forming a document loop within said presenter.

33. The point of sale kiosk of claim 32, wherein said second motor drive mechanism drives said feed rollers to move said document from said presenter in response to said second state of said print signal and stops driving said feed rollers after said document has been driven a predetermined distance.

34. The point of sale kiosk of claim 33, wherein said first drive mechanism moves said presenter to said home position in response to said second state of said document sensor signal.

35. The point of sale kiosk of claim 33, wherein said second motor drive mechanism reverses said feed rollers to move said document into a trash bin within said printer if said document remains in said presenter for a predetermined length of time after said feed position signal transitions to said first state.

36. The point of sale kiosk of claim 22, wherein said point of sale kiosk further comprises a communications adapter coupled to a communications link and to said CPU.

* * * * *